United States Patent
Feng et al.

(10) Patent No.: US 10,387,360 B2
(45) Date of Patent: Aug. 20, 2019

(54) INTEGRATED CIRCUITS ADAPTABLE TO INTERCHANGE BETWEEN CLOCK AND DATA LANES FOR USE IN CLOCK FORWARD INTERFACE RECEIVER

(71) Applicant: M31 Technology Corporation, Hsinchu County (TW)

(72) Inventors: Pin-Hao Feng, Hsinchu County (TW); Yueh-Chuan Lu, New Taipei (TW); Ching-Hsiang Chang, Taipei (TW)

(73) Assignee: M31 Technology Corporation, Hsinchu County (TW)

( * ) Notice: Subject to any disclaimer, the term of this patent is extended or adjusted under 35 U.S.C. 154(b) by 6 days.

(21) Appl. No.: 15/805,098

(22) Filed: Nov. 6, 2017

(65) Prior Publication Data

US 2019/0138488 A1    May 9, 2019

(51) Int. Cl.
*G06F 13/42* (2006.01)
*G06F 1/10* (2006.01)

(52) U.S. Cl.
CPC ............ *G06F 13/4282* (2013.01); *G06F 1/10* (2013.01)

(58) Field of Classification Search
CPC ............................... G06F 13/4282; G06F 1/10
See application file for complete search history.

(56) References Cited

U.S. PATENT DOCUMENTS

| | | | |
|---|---|---|---|
| 9,673,961 B2 | 6/2017 | Sengoku | |
| 2007/0164883 A1 | 7/2007 | Furtner | |
| 2008/0270818 A1* | 10/2008 | Joordens | G06F 1/10 713/500 |
| 2011/0246810 A1* | 10/2011 | Wessel | G06F 1/04 713/501 |
| 2014/0009633 A1* | 1/2014 | Chopra | H04L 7/0012 348/222.1 |
| 2015/0063377 A1* | 3/2015 | Shui | H04L 7/0037 370/517 |
| 2017/0168983 A1* | 6/2017 | Bartley | G06F 13/4291 |
| 2019/0045090 A1 | 2/2019 | Chiueh | |

FOREIGN PATENT DOCUMENTS

| | | |
|---|---|---|
| CN | 103490747 B | 10/2015 |
| JP | 4874113 B2 | 2/2012 |
| TW | 201108106 A1 | 3/2011 |
| WO | 2014/145831 A1 | 9/2014 |

* cited by examiner

*Primary Examiner* — Idriss N Alrobaye
*Assistant Examiner* — Ronald T Modo
(74) *Attorney, Agent, or Firm* — Winston Hsu

(57) ABSTRACT

An integrated circuit includes a first multi-lane interface having a plurality of first lanes, a second multi-lane interface having a plurality of second lanes; a first layer of clock lane selection units arranged to select one or two of the first and second lanes and output signals on the one or two selected lanes; a second layer of clock lane selection units arranged to select the one or two selected lanes as one or two clock lane and output signals on the one or two selected clock lane; and a plurality of sampling units, each coupled to second layer of clock lane selection units, each arranged to sample one of the first and second lanes according to the signal on the selected clock lane.

14 Claims, 4 Drawing Sheets

INTEGRATED CIRCUITS ADAPTABLE TO INTERCHANGE BETWEEN CLOCK AND DATA LANES FOR USE IN CLOCK FORWARD INTERFACE RECEIVER

BACKGROUND OF THE INVENTION

1. Field of the Invention

The present invention relates generally to clock forward interface, and more particularly to integrated circuits adaptable to interchange between clock and data lanes.

2. Description of the Prior Art

A clock forward interface comprises at least one clock lane and data lanes for communication between transmitters and receivers. For certain requirements and applications, it would be favorable for a transmitter to interchange its clock lane and data lanes. Therefore, there is a need to provide an inventive circuit for use in a receiver and make the receiver adaptable to the interchange between the clock lane and data lanes.

SUMMARY OF THE INVENTION

According to one embodiment of the present invention, an integrated circuit is provided. The integrated circuit comprises: a multi-lane interface, a clock lane selection unit and a plurality of sampling units. The multi-lane interface has a plurality of lanes, one of which is a clock lane. The clock lane selection unit is coupled to the multi-lane interface, and arranged to select one of the lanes as a clock lane and output the signal of the selected clock lane. Each of the sampling units is coupled to one of the lanes and the clock lane selection unit, and each is arranged to sample a signal of one of the lanes according to the signal of the selected clock lane.

According to one embodiment of the present invention, an integrated circuit is provided. The integrated circuit comprises a first multi-lane interface, a second multi-lane interface, a first layer of clock lane selection units, a second layer of clock lane selection units and a plurality of sampling units. The first multi-lane interface has a plurality of first lanes and the second multi-lane interface has a plurality of second lanes, wherein one or two of the first lanes and the second lanes is clock lane. The first layer of clock lane selection units is coupled to the first multi-lane interface and the second multi-lane interface, and arranged to select one or two of the first and second lanes and output signals on the one or two selected lanes. The second layer of clock lane selection units is coupled to the first layer of clock lane selection units, arranged to select the one or two selected lanes as one or two clock lane and output signals on the one or two selected clock lane as output. Each of the sampling units is coupled to the second layer of clock lane selection units and each is arranged to sample one of the first and second lanes according to the signal of the one or two selected clock lane.

According to one embodiment of the present invention, a multi-lane communication system is provided. The multi-lane communication system comprises a transmitter and a receiver. The transmitter has a multi-lane interface that includes at least one data lane and at least one clock lane, wherein signals on the at least one data lane and signals on the at least one clock lane are interchangeable. The receiver has an integrated circuit including a clock lane selection unit for selecting one of lanes of the multi-lane interface as a clock lane. The clock lane selection unit is configurable in response to interchange between signals on the at least one data lane and the least one clock lane of the transmitter.

These and other objectives of the present invention will no doubt become obvious to those of ordinary skill in the art after reading the following detailed description of the preferred embodiment that is illustrated in the various figures and drawings.

DETAILED DESCRIPTION

Reference throughout this specification to "one embodiment", or "an example" means that a particular feature, structure or characteristic described in connection with the embodiment or example is included in at least one embodiment of the present embodiments. Thus, appearances of the phrases "in one embodiment", "in or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

Figure 1:
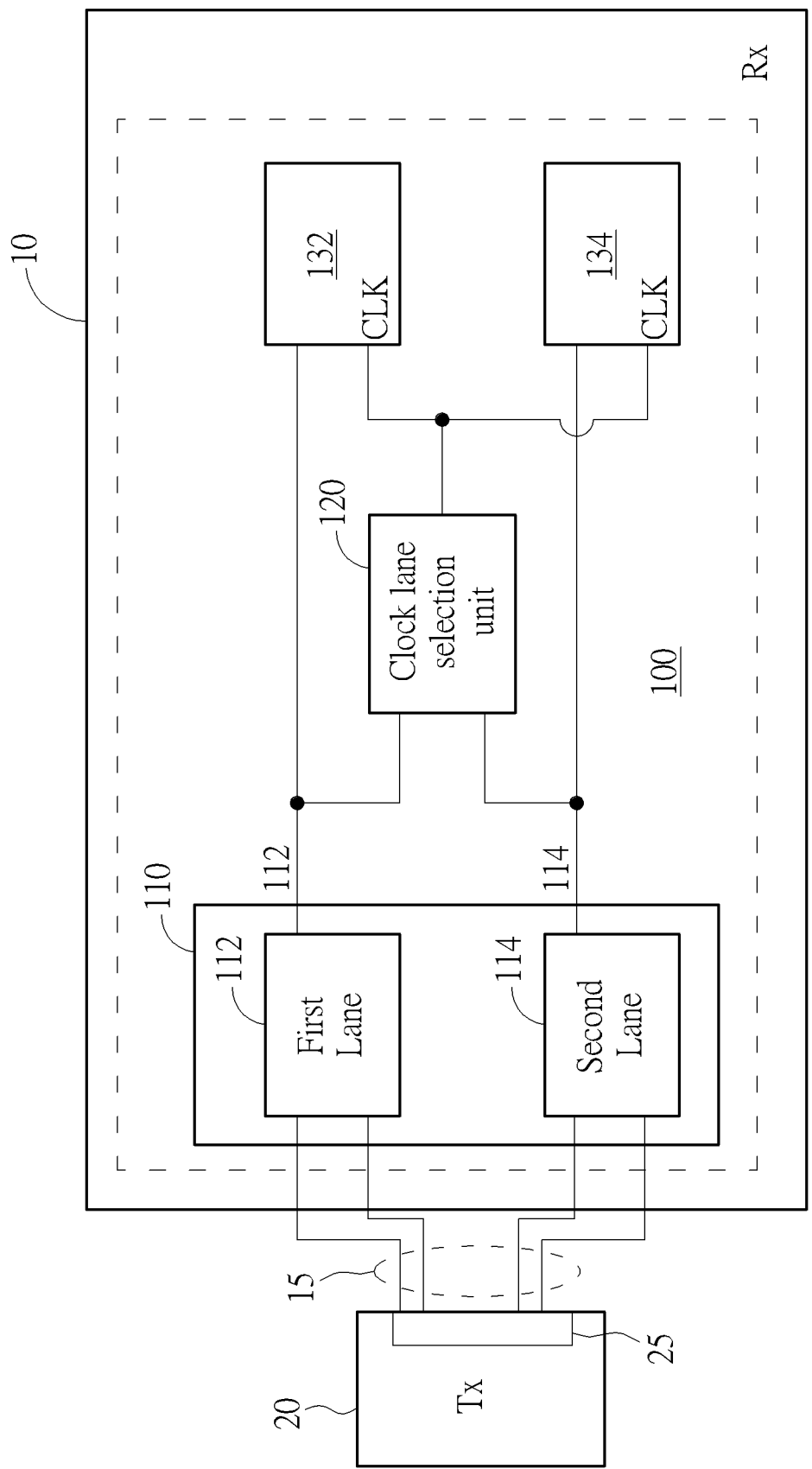
FIG. 1 illustrates a schematic diagram of an integrated circuit according to one embodiment of the present invention.

FIG. 1 illustrates a schematic diagram of an integrated circuit according to one embodiment of the present invention. The integrated circuit 100 may be disposed in a physical layer unit at a receiver 10. The receiver 10 communicates with a transmitter 20 through a communication link 15 therebetween. As illustrated, the integrated circuit 100 comprises a multi-lane interface 110 that is connected to a multi-lane interface 25 of the transmitter 20 through the communication link 15. The multi-lane interface 110 includes a first lane 112 and a second lane 114. The transmitter 20 may have the signals of its data lane and clock lane of the multi-lane interface 25 interchanged. For being adaptable to interchange between clock and data lane asserted by the transmitter 20, any one of the first lane 112 and second lane 114 can be used as a clock lane, while the other is used as a data lane. A clock lane selection unit 120 that is coupled to the multi-lane interface 110 is arranged select which one of the first lane 112 and second lane 114 is the clock lane. The signal of the selected clock lane will be considered as a clock signal for the integrated circuit 100, and sent to clock inputs CLK of sampling units 132 and 134. The sampling units 132 and 134 are respectively arranged to sample signals on first lane 112 and second lane 114 according to the signal from the selected clock lane. Sampling results outputted by the sampling units 132 and 134 may be further sent to other functional blocks in the integrated circuit 100, such as deserializer (not shown).

Figure 2:
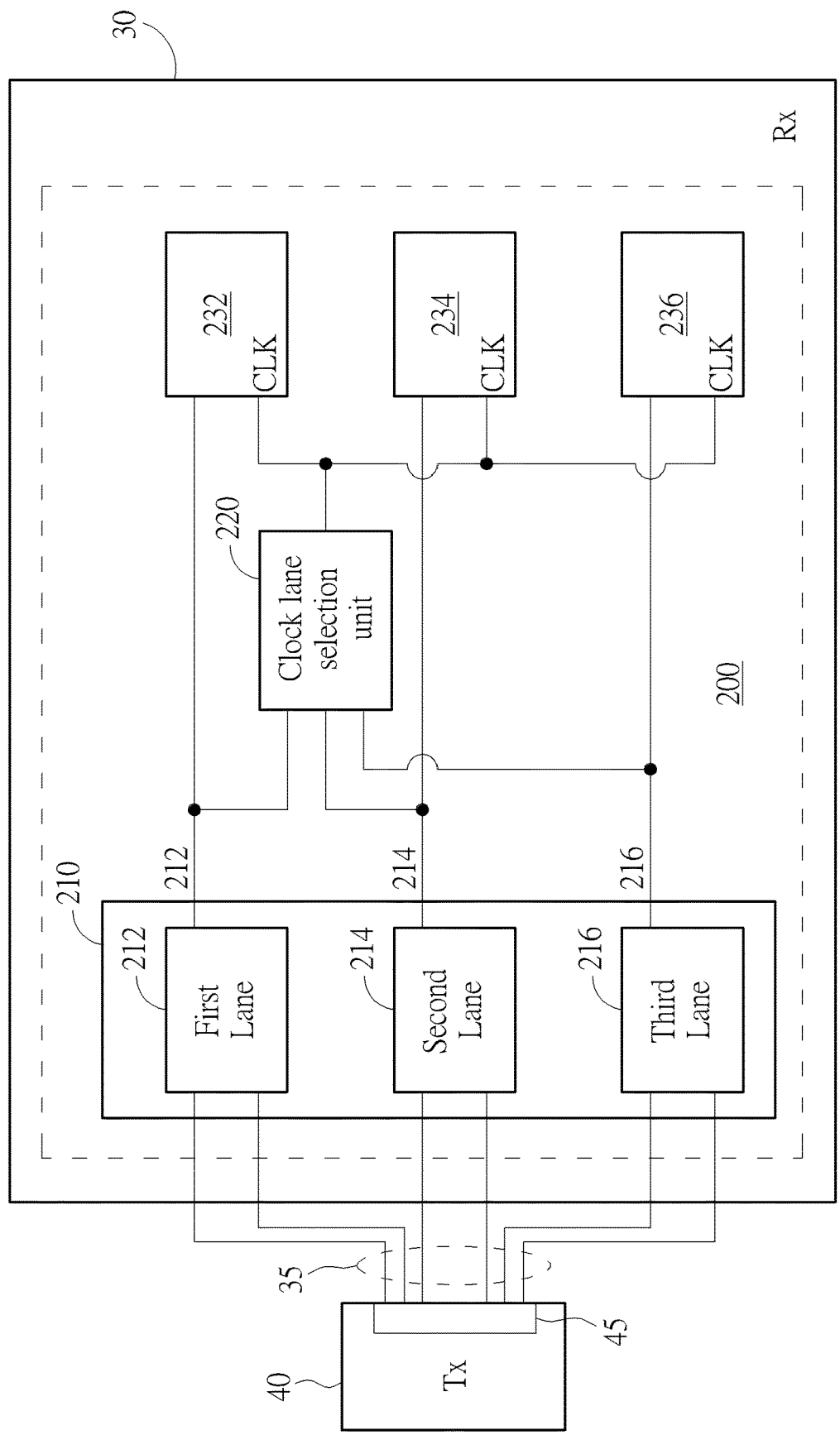
FIG. 2 illustrates a schematic diagram of an integrated circuit according to another embodiment of the present invention.

FIG. 2 illustrates a schematic diagram of an integrated circuit according to one embodiment of the present invention. The integrated circuit 200 may be disposed in a physical layer unit at a receiver 30. The receiver 30 communicates with a transmitter 40 through a communication link 35 therebetween. As illustrated, the integrated circuit 200 comprises a multi-lane interface 210 that is connected to a multi-lane interface 45 of the transmitter 40 through the communication link 35. The multi-lane interface 210 includes a first lane 212, a second lane 214 and a third lane 216. The transmitter 40 may have the signals of its data lane and clock lane of the multi-lane interface 45 interchanged. For being adaptable to interchange between clock and data lane asserted by the transmitter 40, any one of the first lane 212, the second lane 214 and the third lane 216 can be used as a clock lane, while the other lanes are used as data lanes. A clock lane selection unit 220 that is coupled to the multi-lane interface 210 is arranged to determine and select which one of the first lane 212, the second lane 214 and the third lane 216 is the clock lane. The signal of the selected clock lane will be considered as a clock signal for the six-pin integrated circuit 200, and sent to clock inputs CLK of sampling units 232-236. The sampling units 232-236 are respectively arranged to sample signals on the first lane 212, the second lane 214 and the third lane 216 according to the signal of the selected clock lane. Sampling results outputted by the sampling units 232-236 may be further sent to other functional blocks in integrated circuit 200, such as deserializer (not shown).

Figure 3:
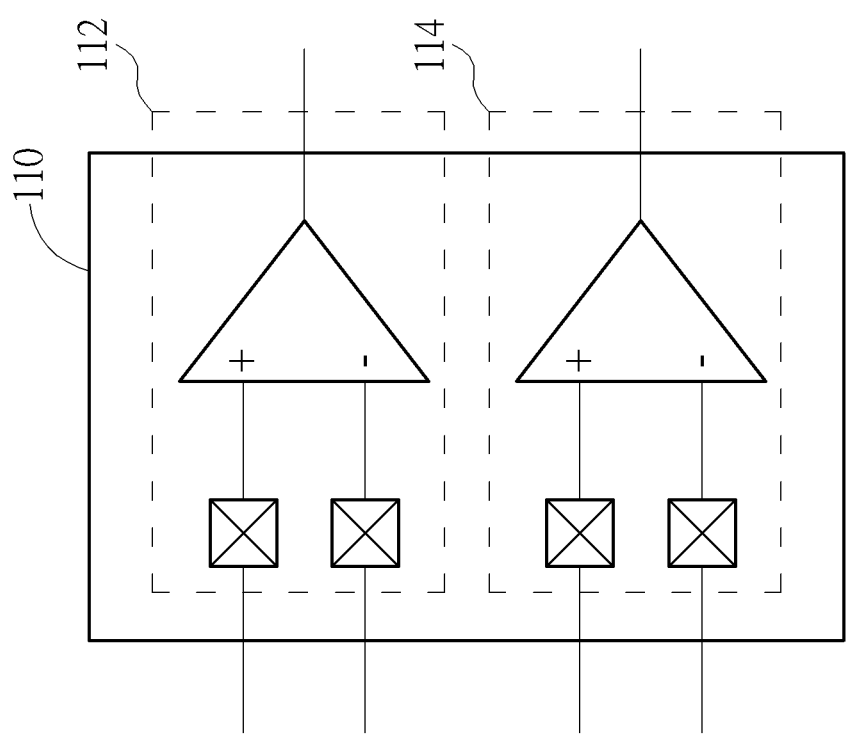
FIG. 3 illustrates a detailed schematic diagram of the multi-lane interface according to another embodiment of the present invention.

Please note that the numbers of the lanes in the multi-lane interface is not a limitation of the present invention, which can be varied with different requirements and applications. For example, the multi-lane interface could include four lanes, eight lanes or any other number of lanes according to various embodiments of the present invention. Besides, the multi-lane interface 110 or 210 may further comprise signal pins and signal amplifiers as the detailed illustration shown by FIG. 3. However, this drawing is just intended for illustrative purposes rather than limitations in scope of the present invention.

In addition, the sampling units 132-134 and 232-236 as mentioned above could be D flip-flops in one embodiment. The clock lane selection units 120 and 220 as mentioned above could be could be multiplexers implemented based on inverters or OR-logic gates, and/or any other types of circuitry having signal path selection capability according to various embodiment of the present invention.

Figure 4:
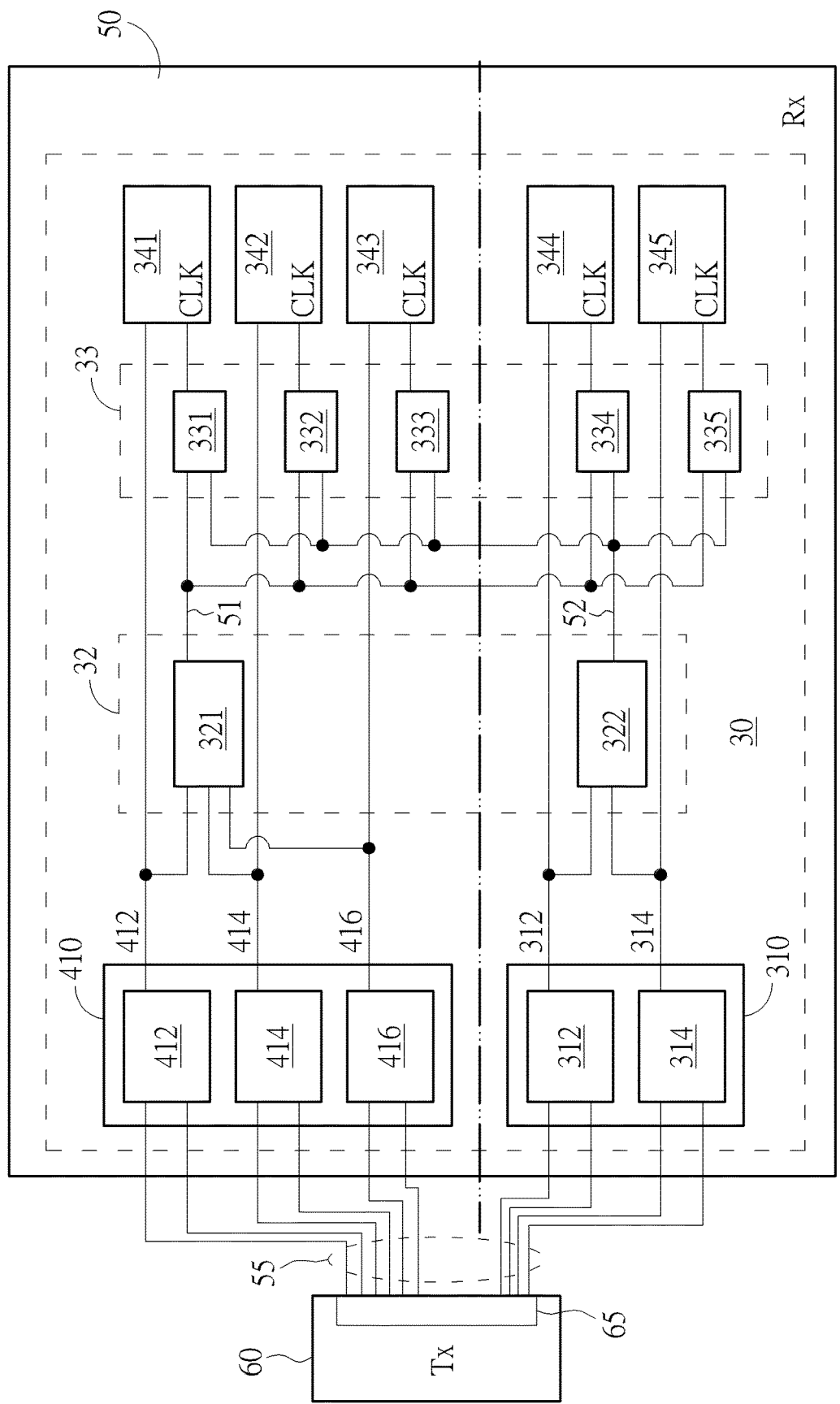
FIG. 4 illustrates a schematic diagram of an integrated circuit according to still another embodiment of the present invention.

FIG. 4 illustrates a schematic diagram of a combination of integrated circuits as mentioned above according to one embodiment of the present invention. The integrated circuit 30 comprises a multi-lane interface 310, which includes lanes 312-314 and a multi-lane interface 410, which includes lanes 412-416. The combination of integrated circuits may be disposed in a physical layer unit at a receiver 50. The receiver 50 communicates with a transmitter 60 through a communication link 55 therebetween. The transmitter 60 has a multi-lane interface 65 comprising data and clock lanes and selectively has signals on the data and clock lanes interchanged.

In this embodiment, one or two lanes of the lanes 312-314 and 412-416 could be one or two clock lanes. The integrated circuit 30 comprises two groups of clock selection lane units for selecting the clock lanes. A first layer of clock selection lane units 32 is a first group of the clock selection lane units that are coupled to the lanes 312-314 and 412-416 and selects a portion of lanes therefrom. Following the first layer of clock selection lane units 32, a second group of the clock selection lane units, that is, a second layer of clock lane selection units 33 is coupled to the first layer of clock selection lane units 32 and selects the clock lane from those lanes selected by the first layer of clock selection lane units 32. The first layer of clock selection units 32 comprises clock lane selection units 321 and 322. The second layer of clock lane selection units 33 comprises clock lane selection units 331-335.

For a "two clock lanes" condition, one of lanes 312 and 314 can be a first clock lane, and one of lanes 412-416 can be a second clock lane, while the other lanes are data lanes. In such condition, the clock lane selection unit 321 in the first layer of clock selection lane units 32 is arranged to select the first clock lane from lanes 412-416, and the clock lane selection unit 322 in the first layer of clock lane selection units 32 is arranged to select the second clock lane from lanes 312 and 314. Signals on the two selected clock lanes will be sent to the second layer of the clock lane selection units 33. The clock lane selection units 331-333 in the second layer of clock lane selection units 33 are arranged to output the signal of the selected first clock lane to sampling units 341-343. The sampling units 341-343 are respectively arranged to sample signals on the lanes 412-416 according to the signal of the selected first clock lane. The clock lane selection units 334-335 in the second layer of clock lane selection units 33 are arranged to output the signal of the selected second clock lane to sampling units 344-345. The sampling units 344-345 are respectively arranged to sample signals on the lanes 312 and 314 according to the signal of the selected second clock lane. Also, sampling results outputted by the sampling units 341-345 may be further sent to other functional blocks in the integrated circuit 30, such as deserializer (not shown)

For a "one clock lane" condition, only one of lanes 312-314 and 412-416 can be a clock lane, while the other lanes are data lanes. In such condition, the first layer of clock lane selection units 32 selects the only one clock lane. The signal of the selected clock lane will be outputted from the clock lane selection unit 321 or 322, and sent to the second layer of clock lane selection units 33. The clock lane selection units 331-335 in the second layer of clock lane selection units 33 will select a signal of one of the paths 51 and 52 from the first layer of clock lane selection units 32 to send to the sampling units 341-345. Accordingly, the sampling units 341-345 are respectively arranged to sample signals on the lanes 312-314 and 412-416 according to the signal of the selected path.

Please note that the numbers of the lanes in the multi-lane interfaces 310 and/or 410 is not a limitation of the present invention, which can be varied with different requirements and applications. For example, the multi-lane interface 310/

410 could include four lanes, eight lanes or any other number of lanes according to various embodiments of the present invention.

In addition, the sampling units 341-345 as mentioned above could be D flip-flops in one embodiment. The clock lane selection units 321-322 and 331-335 as mentioned above could be could be multiplexers implemented based on inverters or OR-logic gates, and/or any other types of circuitry having signal path selection capability according to various embodiment of the present invention.

The above-mentioned integrated circuits could be used in a receiver for providing a receiver the adaptability to interchange between the clock lane and the data lanes asserted by a transmitter.

According to various embodiments of the present invention, there are different manners for the receiver to configure the clock lane selection units 120 and 220, or the first layer of clock lane selection units 32 and the second layer of clock lane selection units 33.

In one embodiment, the transmitter may provide extra information to indicate which lane could be the clock lane. According to the information provided by the transmitter, the receiver will configure the clock lane selection units to select the proper lane as the clock lane. Therefore, the receiver is able to correctly use signals on the clock lane in processing of signals on other data lanes.

In one embodiment, the transmitter will not use any extra information to indicate the clock lane for the receiver. Instead, the transmitter generates clock signal on the lane by repeating a specific bit pattern. For example, the transmitter may repeatedly send a bit pattern "01", such as 01010101, as a clock signal. In this regards, the receiver can recognize which lane is the clock lane by checking whether a bit stream received on a lane has a repeating bit pattern therein. That is, the receiver configures the clock lane selection unit according to a detecting result of a "known" repeating bit pattern.

In one embodiment, a system application regarding the receiver determines which lanes of the multi-lane interface will be used as the clock lane. According to commands issued by the system application, the receiver will configure the clock lane selection unit to select proper lane as the clock lane.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated circuit in a physical layer unit at a receiver, comprising:
    a first multi-lane interface having a plurality of first lanes;
    a second multi-lane interface having a plurality of second lanes, wherein one or two of the first lanes and the second lanes is clock lane, and at least one of the first lanes and the second lanes is a data lane;
    a first layer of clock lane selection units, coupled to the first multi-lane interface and the second multi-lane interface, arranged to select one or two of the first and second lanes and output signals on the one or two selected lanes;
    a second layer of clock lane selection units, coupled to the first layer of clock lane selection units, arranged to select the one or two selected lanes as one or two clock lanes and output signals of the one or two selected clock lanes; and
    a plurality of sampling units, each coupled to the second layer of clock lane selection units, each arranged to sample one of the first and second lanes according to the signal from the one or two selected clock lanes.

2. The integrated circuit of claim 1, wherein the first layer of clock lane selection units comprises a first clock lane selection unit and a second clock lane selection unit, and the first clock lane selection unit selects a first clock lane from the first lanes of the first multi-lane interface and output the signal of the selected first clock lane to the second layer of clock lane selection units, and the second clock lane selection unit selects a second clock lane from the second lanes of the second multi-lane interface and output the signal of the selected second clock lane to the second layer of clock lane selection units.

3. The integrated circuit of claim 2, wherein the second layer of the clock lane selection units outputs the signal of the selected first clock lane to a first ones of the sampling units and outputs the signal of the selected second clock lane to a second ones of the sampling units.

4. The integrated circuit of claim 1, wherein the first layer of clock lane selection units selects only one clock lane from the first lanes of the first multi-lane interface and the second lanes of the second multi-lane interface and outputs the signal of the selected only one clock lane to the second layer of clock lane selection units.

5. The integrated circuit of claim 4, wherein the second layer of the clock lane selection units selects the signal of the only one clock lane outputted by the first layer of clock lane selection units and outputs it to all of the sampling units.

6. The integrated circuit of claim 1, wherein the sampling units are D flip-flops; and the clock lane selection unit is an inverter-based multiplexer or OR-gate-based multiplexer.

7. The integrated circuit of claim 1, wherein the integrated circuit further comprises a deserializer, and sampling results generated by the sampling unit are further sent to the deserializer.

8. The integrated circuit of claim 1, the first or the second clock lane selection unit is configured by information sent from a transmitter that the receiver communicates with.

9. The integrated circuit of claim 1, the first or the second clock lane selection unit is configured by a system application that is independent of a transmitter that the receiver communicates with.

10. The integrated circuit of claim 1, the first or the second clock lane selection unit is configured by a detect result of detecting a repeating bit pattern on the lanes of the first or the second multi-lane interface.

11. A multi-lane communication system comprising:
    a transmitter having a multi-lane interface that includes at least one data lane and at least one clock lane; and
    a receiver having the integrated circuit of claim 1, wherein the clock lane selection unit is operated in response to signals of the least one data lane and the at least one clock lane of the multi-lane interface of the transmitter.

12. The multi-lane communication system of claim 11, the clock lane selection unit is configured by information sent from a transmitter that the receiver communicates with.

13. The multi-lane communication system of claim 11, the clock lane selection unit is configured by a system application that is independent of a transmitter that the receiver communicates with.

14. The multi-lane communication system of claim 11, the clock lane selection unit is configured by a detect result of detecting a repeating bit pattern on the lanes of the multi-lane interface.

* * * * *